(12) United States Patent
Hwang

(10) Patent No.: US 9,058,157 B2
(45) Date of Patent: Jun. 16, 2015

(54) ORGANIC LIGHT EMITTING DIODE DISPLAY

(75) Inventor: Jung-Ho Hwang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 802 days.

(21) Appl. No.: 13/287,408

(22) Filed: Nov. 2, 2011

(65) Prior Publication Data

US 2012/0134163 A1    May 31, 2012

(30) Foreign Application Priority Data

Nov. 29, 2010 (KR) ........................ 10-2010-0119887

(51) Int. Cl.
| | |
|---|---|
| H05K 7/14 | (2006.01) |
| H02B 1/01 | (2006.01) |
| G02F 1/1333 | (2006.01) |
| F21S 8/00 | (2006.01) |
| H05K 1/02 | (2006.01) |
| G06F 1/20 | (2006.01) |
| G06F 1/16 | (2006.01) |
| H04N 5/64 | (2006.01) |

(52) U.S. Cl.
CPC ............... *G06F 1/20* (2013.01); *G06F 1/1601* (2013.01); *H04N 5/64* (2013.01); *G06F 2200/1612* (2013.01)

(58) Field of Classification Search
CPC ................................ G11B 33/08; B81B 3/007
USPC ..................... 174/259, 544; 349/58; 362/432; 361/829
See application file for complete search history.

(56) References Cited

U.S. PATENT DOCUMENTS

| | | | | |
|---|---|---|---|---|
| 2006/0044490 | A1* | 3/2006 | Ichioka et al. | 349/58 |
| 2007/0170324 | A1* | 7/2007 | Lee et al. | 248/247 |
| 2009/0061166 | A1* | 3/2009 | Ayukawa | 428/194 |
| 2010/0101856 | A1* | 4/2010 | Yee et al. | 174/544 |
| 2010/0103641 | A1* | 4/2010 | Cho et al. | 361/829 |
| 2010/0142178 | A1* | 6/2010 | Yee et al. | 361/829 |
| 2011/0187692 | A1* | 8/2011 | Jung | 345/211 |

FOREIGN PATENT DOCUMENTS

| | | |
|---|---|---|
| KR | 10-2006-0008744 A | 1/2006 |
| KR | 10-2006-0087722 A | 8/2006 |
| KR | 10-2010-0009914 A | 1/2010 |

* cited by examiner

*Primary Examiner* — Timothy Thompson
*Assistant Examiner* — Sherman Ng
(74) *Attorney, Agent, or Firm* — Robert E. Bushnell, Esq.

(57) ABSTRACT

An organic light emitting diode (OLED) display includes a display panel for displaying images, a bracket for supporting the display panel, a buffer member disposed between each corner region of the display panel and the bracket, and an adhesive member disposed between the display panel and the bracket to combine the display panel with the bracket.

20 Claims, 3 Drawing Sheets

ORGANIC LIGHT EMITTING DIODE DISPLAY

CLAIM OF PRIORITY

This application makes reference to, incorporates the same herein, and claims all benefits accruing under 35 U.S.C. §119 from an application earlier filed in the Korean Intellectual Property Office on 29 Nov. 2010 and there duly assigned Serial No. 10-2010-0119887.

BACKGROUND OF THE INVENTION

1. Field of the Invention

The described technology relates generally to an organic light emitting diode (OLED) display. More particularly, the described technology relates generally to a display device with improved durability and stability.

2. Description of the Related Art

An organic light emitting diode (OLED) display has self-luminous characteristics, and does not require a separate light source unlike a liquid crystal display (LCD), so that a reduction in thickness and weight may be achieved. Further, the organic light emitting diode (OLED) display exhibits quality characteristics such as low power consumption, high luminance, and high response speed.

In detail, the organic light emitting diode display includes a display panel on which organic light emitting elements are formed, a bracket arranged to face the rear of the display panel and supporting the display panel, and a flexible printed circuit (FPC) disposed to the rear of the bracket and connected to an edge of the display panel.

The display panel on which organic light emitting elements are formed has weak impact resistance, differing from the liquid crystal display panel filled with liquid crystal. Particularly, as the size of the display panel becomes greater, it becomes difficult to protect the display panel from outer impacts and support it in a secure manner.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide a display device with improved impact resistance.

An exemplary embodiment provides an organic light emitting diode (OLED) display including: a display panel for displaying an image; a bracket for supporting the display panel; a buffer member disposed between a corner region of the display panel and the bracket; and an adhesive member disposed between the display panel and the bracket to combine the display panel with the bracket.

The buffer member is disposed to face the rear and a side of the display panel.

The buffer member includes a first face facing the rear of the display panel and a side wall facing a side of the display panel.

A groove is formed on the side wall facing a corner vertex of the display panel so that the side wall may be separated from the corner vertex of the display panel.

The buffer member includes a second face having a coupling protrusion protruding therefrom, the second face facing the bracket.

The bracket includes a coupling hole into which the coupling protrusion of the buffer member is inserted.

The organic light emitting diode display further includes a flexible printed circuit (FPC) disposed near a second side of the bracket combined with the display panel and connected to an edge of the display panel, the second side of the bracket being opposite a first side thereof facing the display panel.

The adhesive member is made of thermally-conductive adhesive material.

The buffer member is made of a material that is relatively more elastic than the display panel and the bracket.

The buffer member is made of a resin material.

The bracket is formed by pressing a metal material.

According to an exemplary embodiment, the organic light emitting diode (OLED) display can improve impact resistance.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
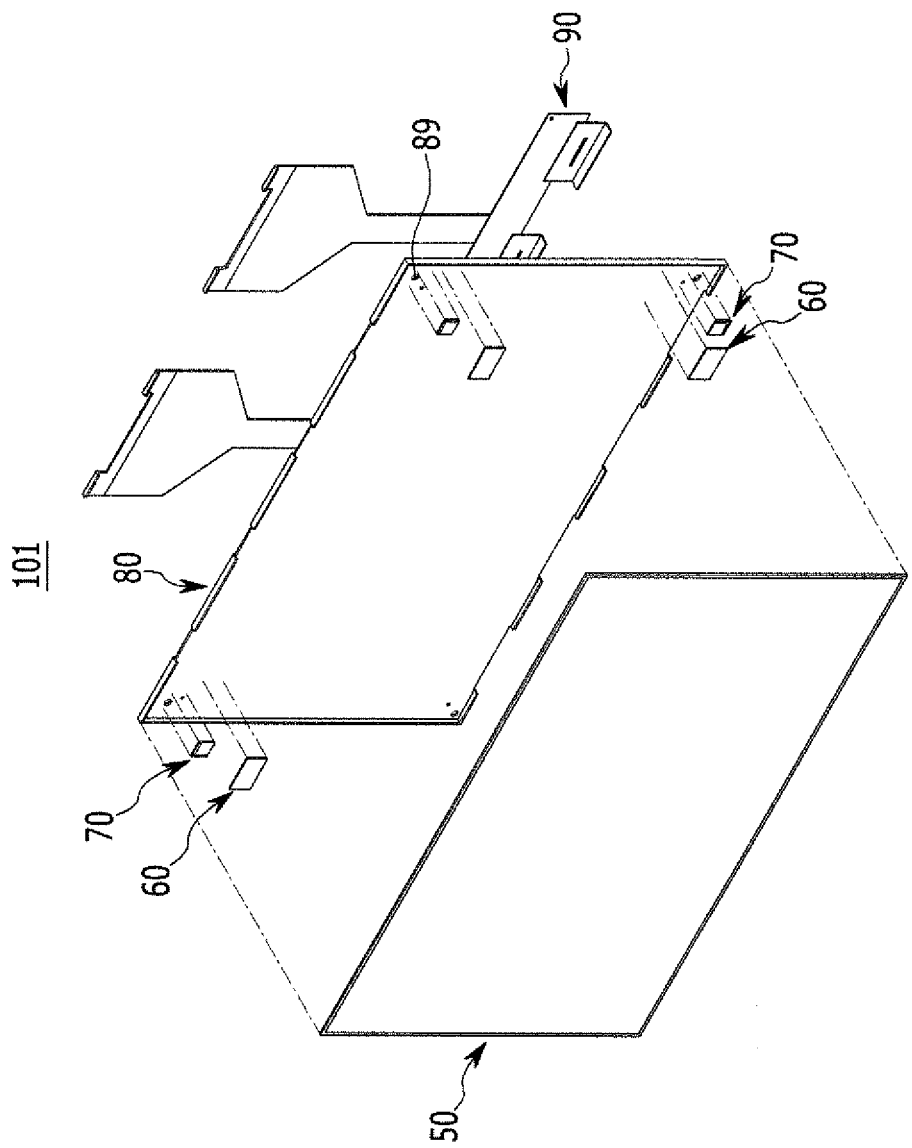
FIG. 1 shows an exploded perspective view of an organic light emitting diode (OLED) display according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Like reference numerals designate like elements throughout the specification.

The size and thickness of each component shown in the drawings are arbitrarily shown for understanding and ease of description, but the present invention is not limited thereto. In the drawings, the thickness of layers, films, panels, regions, etc., are exaggerated for clarity. In addition, in the drawings, for understanding and ease of description, the thicknesses of some layers and areas are exaggerated.

Referring to, FIG. 1 to FIG. 3, an organic light emitting diode (OLED) display 101 according to an exemplary embodiment will now be described.

As shown in FIG. 1, the organic light emitting diode (OLED) display 101 includes a display panel 50, a bracket 80, a buffer member 70, an adhesive member 60, and a flexible printed circuit (FPC) 90.

The display panel 50 displays images through a plurality of pixels. The pixel represents the minimum unit for displaying an image. A plurality of thin film transistors and at least one organic light emitting element and a capacitor are disposed for each pixel. That is, the display panel 50 displays the image through the light output by the organic light emitting element formed by each pixel. Here, the organic light emitting element, the thin film transistor, and the capacitor can be formed in various ways by a person skilled in the art.

The bracket 80 is combined with the display panel 50 to support and protect the display panel 50. The bracket 80 includes a coupling hole 89 formed in a corner region. Also, the bracket 80 is formed by pressing a metal material.

The adhesive member 60 is disposed between the display panel 50 and the bracket 80, and combines the display panel 50 with the bracket 80. Further, the adhesive member 60 can be made with various kinds of thermally-conductive adhesive materials known to a person skilled in the art. Hence, the adhesive member 60 can improve heat dissipation efficiency by efficiently transmitting the heat generated by the display panel 50 to the bracket 80 made of a metal material.

Referring to FIG. 1, the adhesive member 60 is disposed near the corner region of the display panel 50, that is, near the buffer member 70, and the attaching positions and the number of adhesive members 60 are variable depending on the cases.

The flexible printed circuit (FPC) 90 is disposed near the rear of the bracket 80, that is, a second side opposite the first side of the bracket 80 combined with the display panel 50. The flexible printed circuit (FPC) 90 is connected to the edge of the display panel 50. For example, the flexible printed circuit (FPC) 90 can include a flexible printed circuit (FPC) main body, and a flexible printed circuit (FPC) connecting the flexible printed circuit (FPC) main body and the display panel.

The buffer member 70 is disposed between the corner region of the display panel 50 and the bracket 80. The buffer member 70 buffers impacts applied to the display panel 50. Particularly, the buffer member 70 buffers an impact applied to the corner region of the display panel 50 that is weak with respect to impact and is relatively easily damaged.

The buffer member 70 is made of a material that is relatively more elastic than the display panel 50 and the bracket 80. For example, the buffer member 70 may be made of a resin material.

Figure 2:
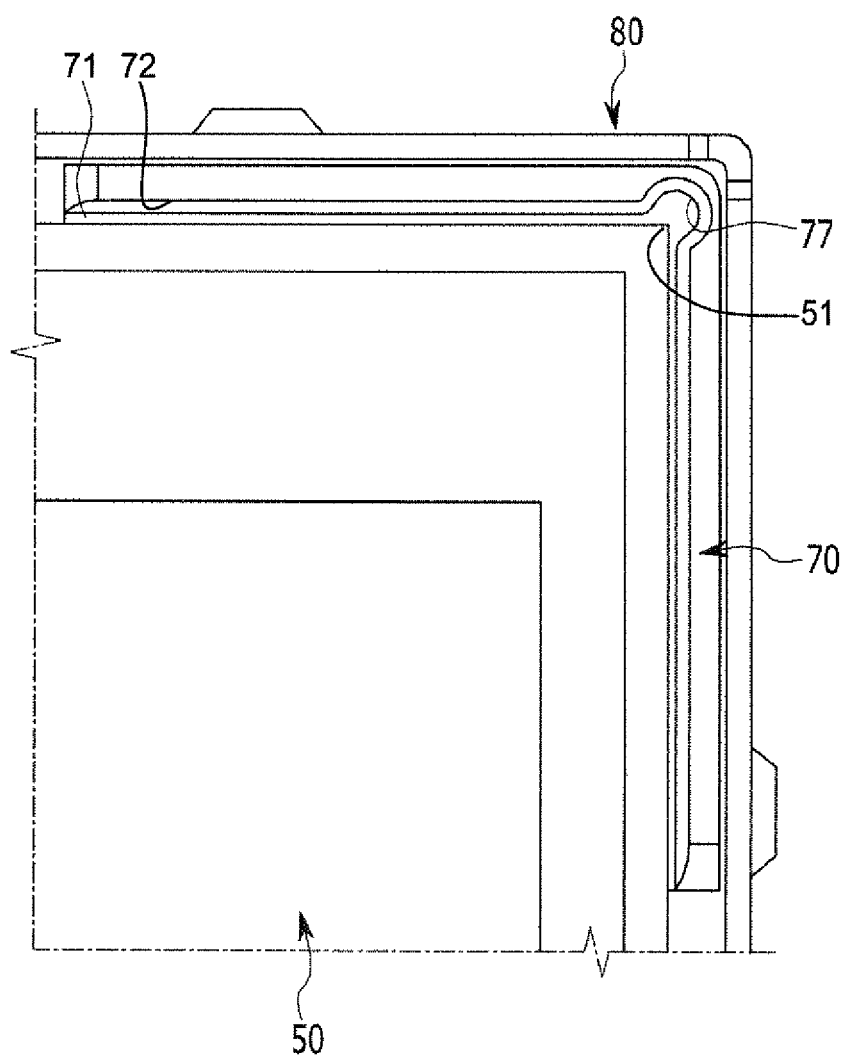
FIG. 2 shows a front view for magnifying a corner region while an organic light emitting diode (OLED) display of FIG. 1 is combined.

As shown in FIG. 2, the buffer member 70 is disposed to face the rear and side of the display panel 50 in the corner region of the display panel 50. In detail, the buffer member 70 includes a first face 71 facing the rear of the display panel 50 and an inner side wall 72 facing the side (outer edge) of the display panel 50. Further, the buffer member 70 of the organic light emitting diode (OLED) display 101 has a groove 77 such that the inner side wall 72 facing a corner vertex 51 of the display panel 50 is separated from the corner vertex 51 of the display panel 50. Accordingly, the buffer member 70 buffers the impact applied to the corner region of the display panel 50 and prevents the corner vertex 51 of the display panel 50 from contacting the buffer member 70 and being damaged.

Figure 3:
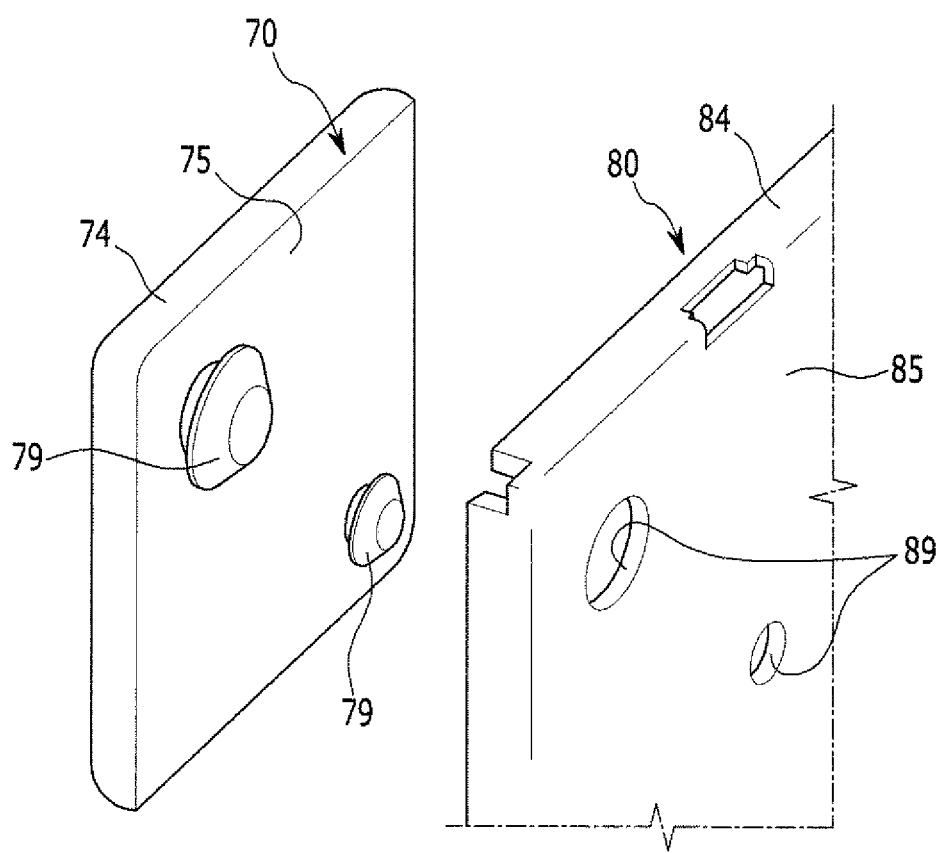
FIG. 3 shows a rear-side exploded perspective view for magnifying a buffer member and a bracket of FIG. 1.

Also, as shown in FIG. 3, the buffer member 70 further includes a coupling protrusion 79 protruded from a second face 75 facing the bracket 80. The coupling protrusion 79 is inserted into a coupling hole 89 of the bracket 80 to combine the buffer member 70 and the bracket 80. In FIG. 3, the coupling protrusion 79 and the coupling hole 89 are combined in a hook structure, and the exemplary embodiment is not limited thereto.

The bracket 80 includes a plate 85 having one side facing the rear of the display panel 50 and a guide 84 bent from the plate 85 and facing the side of the display panel 50, and the coupling hole 89 is formed in the corner region of the plate 85.

As shown in FIG. 3, each buffer member 70 may have a square or rectangular shape and comprise a pair of coupling protrusions 79 in diagonally disposed in opposite corners and extending from the second face 75 of the buffer member 70.

Additionally, plate 85 of bracket 80 comprises a corresponding pair of coupling holes 89 for each buffer member 70.

As shown in FIG. 3, the coupling protrusions 79 have a cone shape to assist with alignment and insertion through coupling holes 89, such that the coupling protrusions 79 hook onto plate 85.

According to the above-noted configuration, the organic light emitting diode (OLED) display 101 can improve impact resistance. Particularly, the corner vertex 51 of the display panel 50 is securely prevented from being damaged.

Also, the organic light emitting diode (OLED) display 101 can improve heat dissipation efficiency.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light emitting diode (OLED) display, comprising:
    a display panel displaying an image;
    a bracket supporting the display panel;
    a buffer member disposed between a corner region of the display panel and the bracket; and
    an adhesive member disposed between the display panel and the bracket to combine the display panel with the bracket;
    the buffer member includes a coupling protrusion protruding from a first face of the buffer member, the first face facing the bracket, and the bracket including a coupling hole into which the coupling protrusion of the buffer member is inserted.

2. The organic light emitting diode (OLED) display of claim 1, the buffer member is disposed to face a rear surface and a side surface of the display panel.

3. The organic light emitting diode (OLED) display of claim 2, the buffer member includes a second face facing the rear surface of the display panel and an inner side wall facing the side of the display panel.

4. The organic light emitting diode (OLED) display of claim 3, a groove is formed on the inner side wall facing a corner vertex of the display panel so that the inner side wall may be separated from the corner vertex of the display panel.

5. The organic light emitting diode (OLED) display of claim 1, further comprising a flexible printed circuit (FPC) disposed near a first side of the bracket combined with the display panel and connected to an edge of the display panel, the first side of the bracket being opposite to a second side of the bracket facing the display panel.

6. The organic light emitting diode (OLED) display of claim 1, the adhesive member is made of thermally-conductive adhesive material.

7. The organic light emitting diode (OLED) display of claim 1, the buffer member is made of a material relatively more elastic than the display panel and the bracket.

8. The organic light emitting diode (OLED) display of claim 7, the buffer member is made of a resin material.

9. The organic light emitting diode (OLED) display of claim 7, the bracket is formed by pressing a metal material.

10. The organic light emitting diode (OLED) display of claim 3, the buffer member has one of a square shape and a rectangular shape and comprises a pair of coupling protrusions diagonally disposed in opposite corners and extended from the second face of the buffer member.

11. An organic light emitting diode (OLED) display, comprising:
- a display panel displaying an image;
- a bracket supporting the display panel;
- a buffer member disposed between a corner region of the display panel and the bracket; and
- an adhesive member disposed between the display panel and the bracket to combine the display panel with the bracket;
- a groove formed on an inner side wall facing a corner vertex of the display panel so that the inner side wall may be separated from the corner vertex of the display panel.

12. The organic light emitting diode (OLED) display of claim 11, the buffer member is disposed to face a rear surface and a side surface of the display panel.

13. The organic light emitting diode (OLED) display of claim 12, the buffer member includes a first face facing the rear surface of the display panel and an inner side wall facing the side surface of the display panel.

14. The organic light emitting diode (OLED) display of claim 12, the buffer member includes a coupling protrusion protruding from a second face of the buffer member, the second face facing the bracket, and the bracket including a coupling hole into which the coupling protrusion of the buffer member is inserted.

15. The organic light emitting diode (OLED) display of claim 12, the buffer member includes a pair of coupling protrusions protruding from a second face of the buffer member, the second face facing the bracket, and the bracket including a corresponding pair of coupling holes into which the coupling protrusions of the buffer member are inserted.

16. The organic light emitting diode (OLED) display of claim 14, the coupling protrusion is cone shaped.

17. An organic light emitting diode (OLED) display, comprising:
- a display panel displaying an image;
- a bracket supporting the display panel;
- a buffer member disposed between a corner region of the display panel and the bracket; and
- an adhesive member disposed between the display panel and the bracket to combine the display panel with the bracket; and
- a flexible printed circuit (FPC) disposed near a first side of the bracket combined with the display panel and connected to an edge of the display panel, the first side of the bracket being opposite from a second side of the bracket facing the display panel,
- the buffer member includes a pair of coupling protrusions facing the bracket.

18. An organic light emitting diode (OLED) display, comprising:
- a display panel displaying an image;
- a bracket supporting the display panel;
- a buffer member disposed between a corner region of the display panel and the bracket; and
- an adhesive member disposed between the display panel and the bracket to combine the display panel with the bracket;
- the buffer member having one of a square shape and a rectangular shape and comprising a pair of coupling protrusions diagonally disposed in opposite corners and extended from a face of the buffer member.

19. The organic light emitting diode (OLED) display of claim 18, the buffer member is disposed to face a rear surface and a side surface of the display panel.

20. The organic light emitting diode (OLED) display of claim 19, the buffer member includes a first face facing the rear surface of the display panel and an inner side wall facing the side surface of the display panel.

* * * * *